United States Patent [19]

Lauer

[11] 4,105,108

[45] Aug. 8, 1978

[54] APPARATUS FOR ORIENTING HALVED FRUIT CUT SIDE UP

[76] Inventor: George E. Lauer, 6250 Melville Dr., Oakland, Calif. 94611

[21] Appl. No.: 776,905

[22] Filed: Mar. 11, 1977

[51] Int. Cl.² ............................................. B65G 47/24
[52] U.S. Cl. .................................. 198/402; 198/400; 193/46; 198/399
[58] Field of Search .............. 198/383, 390, 399, 400, 198/771, 406, 416, 403, 396, 382, 389, 391, 402, 409, 412; 193/46, 47, 44; 99/549, 550

[56] References Cited

U.S. PATENT DOCUMENTS

| 2,337,394 | 12/1943 | Kok ..................................... | 198/399 |
| 2,831,564 | 4/1958 | Pavesi ................................. | 198/402 |
| 2,832,460 | 4/1958 | Lauer .................................. | 198/399 |

*Primary Examiner*—Bruce H. Stoner, Jr.
*Assistant Examiner*—Joseph E. Valenza
*Attorney, Agent, or Firm*—Harris Zimmerman

[57] ABSTRACT

An apparatus for orienting halved fruit with the cut sides thereof facing upwardly includes a longitudinally extending vibrating table which is inclined slightly downwardly from the receiving end to the discharge end. The table is provided with longitudinally extending opposed side walls, with a bottom extending therebetween to define a channel along which the fruit translates. In the first, receiving section of the apparatus, the bottom is inclined laterally as well as longitudinally. In the second section, contiguous with the first, a trough narrower than the width of the fruit is disposed generally adjacent to the lower edge of the laterally inclined bottom. The vertical side walls of the trough diverge slightly to increase the width of the trough. In the third section of the apparatus, the bottom is inclined more steeply longitudinally, and the medial side wall of the trough flares outwardly to join one of the side walls of the table. The discharge end of the apparatus is provided with a concave bottom and low side walls to deliver the oriented fruit.

7 Claims, 7 Drawing Figures

U.S. Patent    Aug. 8, 1978    4,105,108
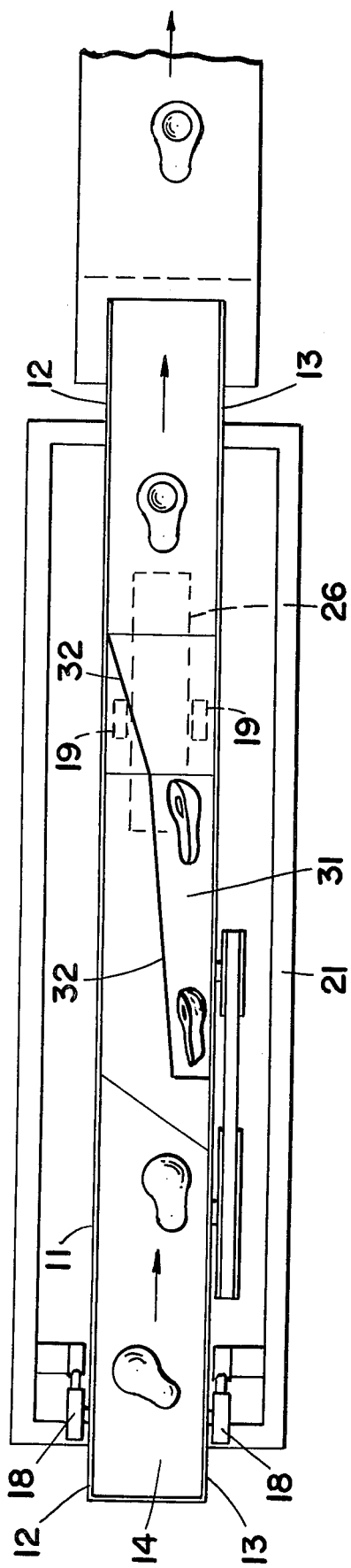
FIG_1
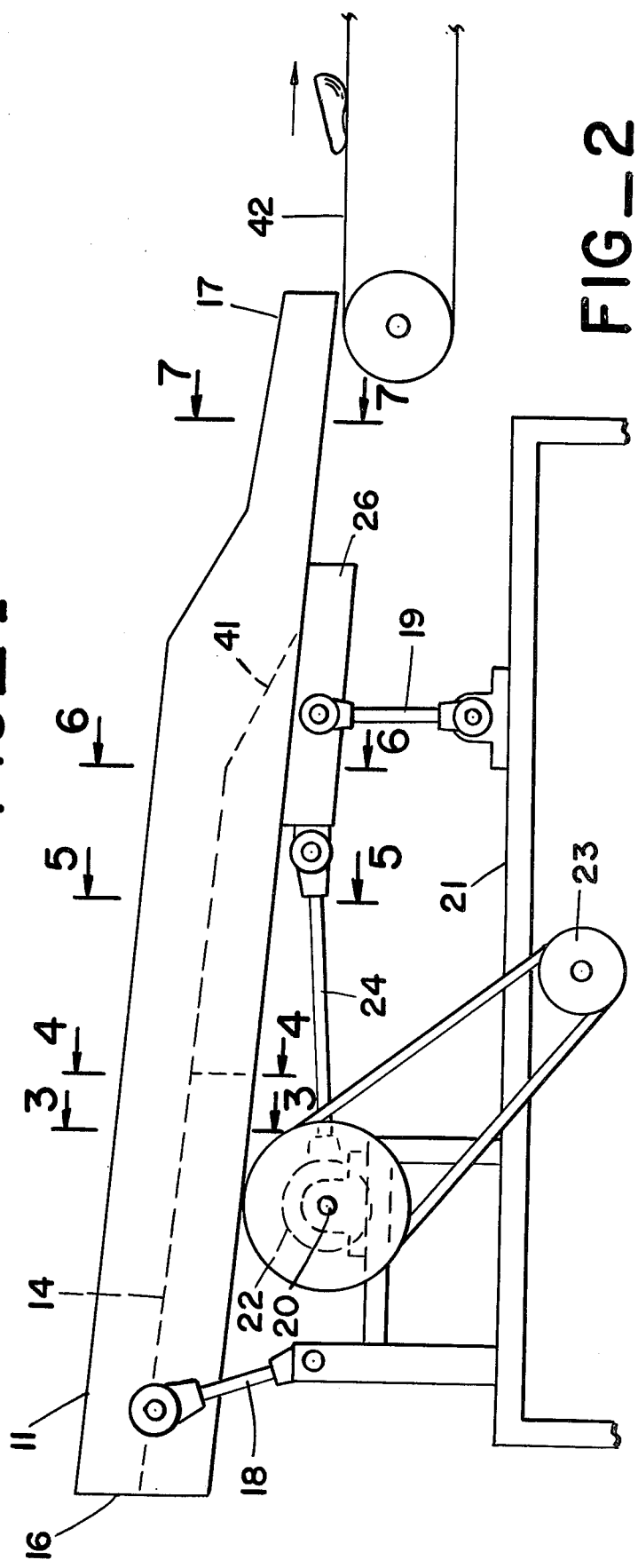
FIG_2

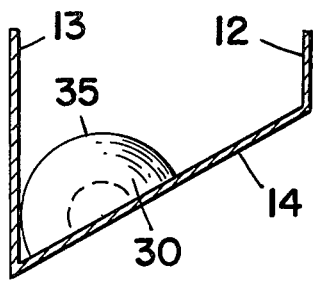
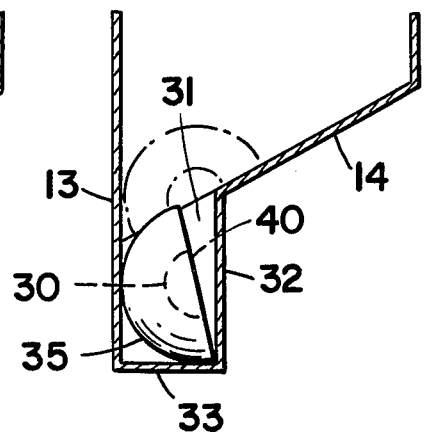
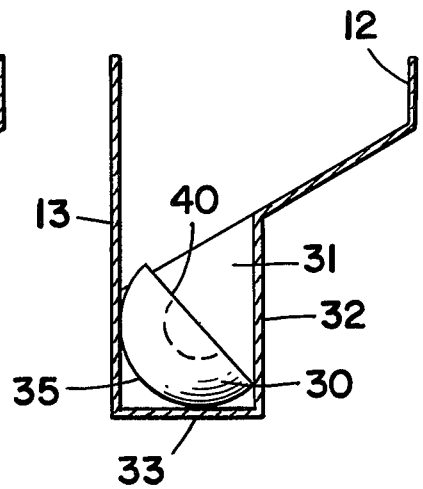
FIG_3  FIG_4  FIG_5
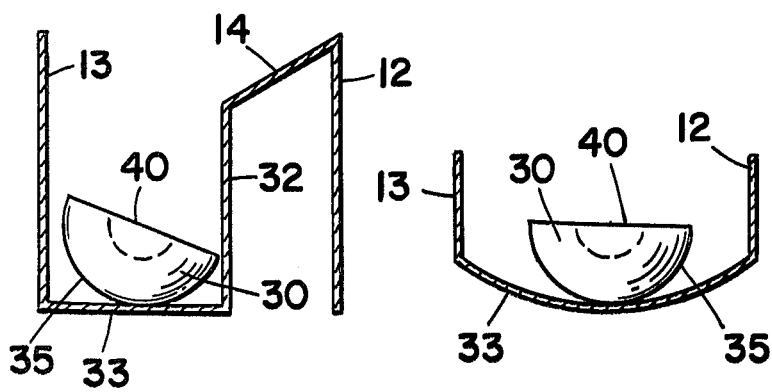
FIG_6  FIG_7

APPARATUS FOR ORIENTING HALVED FRUIT CUT SIDE UP

BACKGROUND OF THE INVENTION

The following United States Patents exemplify the state of the art in fruit orientation devices:

U.S. Pat. No. 2,832,459
U.S. Pat. No. 2,832,460
U.S. Pat. No. 3,598,223

In the processing and packing of cut fruit halves, and in particular peach and pear halves, it is often necessary to properly orient large numbers of the fruit halves with the cut side up. This may be necessary for proper fruit orientation with respect to packing, or to facilitate visual inspection of the coring of the fruit halves, or the like. Also, the fruit halves must be oriented cut side up to facilitate washing away any debris or fruit fragments which result from the coring operation.

Prior art fruit orienting apparatus have generally relied upon lateral guide members or bumpers to direct the halved fruit pieces into orienting troughs or the like on an inclined shaker table. Generally speaking, the troughs support the fruit pieces in such a manner, and the walls of the trough are disposed in such a way, so that the fruit pieces must fall into the cut side up orientation. The flow of the fruit along the table is caused by the shaking thereof, as well as the inclination thereof. Usually the discharge end of the apparatus feeds a high speed conveyor which conducts the fruit to an inspection station or packing apparatus.

It has been found that the lateral guides or bumpers which direct the fruit into the troughs of the table at the upper end thereof occasionally cause several pieces of fruit to jam together, interrupting the flow of fruit down the table. Although the shaking of the table generally permits these jams to clear themselves, the jams do cause a delay or hiatus in the output of the fruit orienting apparatus. Due to the fact that the high speed belt is fed by the orienting apparatus, and often operates in velocities in excess of three hundred feet per minute, a one or two second hiatus in the output of the fruit orienting apparatus will cause five or ten feet of the high speed belt to be empty. Any empty gaps on the high speed belt, which feeds the remainder of the processing and packing operation, correspond to a loss of productivity in the entire packing operation.

Furthermore, it has been found that no matter how well designed have been the prior art devices, it was still possible for some fruit halves to move completely through the fruit orienting machine in a cut face down position, and remain in that position until discharge.

SUMMARY OF THE PRESENT INVENTION

The present invention generally comprises a halved fruit orienting apparatus which orients the fruit into the cut face up disposition with greater assurance than any prior art device. Furthermore, the apparatus of the present invention provides no impediment to the flow of the fruit pieces through the apparatus, to assure a steady supply of properly oriented fruit to subsequent fruit processing operations.

The apparatus of the present invention generally comprises a shaker table which is inclined downwardly from the receiving end thereof to the discharge end. The shaker table may be provided with one or more fruit flow channels, each of which orient the fruit pieces in the proper cut face up disposition.

The receiving portion of each fruit flow channel comprises a pair of spaced parallel side walls, and a bottom which extends therebetween and is inclined laterally downwardly toward one of the side walls, as well as longitudinally toward the discharge end. The fruit pieces are thus caused to slide toward the one wall as they proceed down the receiving portion of the table. The next portion of the table concludes a longitudinally extending rectangular trough. The walls and bottom of the trough are disposed perpendicularly to each other, with one of the walls of the trough being coextensive with the one wall of the fruit flow channel. The width of the trough is substantially less than the width of the fruit pieces passing therethrough, so that the fruit is disposed generally on edge with the arcuate portion thereof leaning against one of the side walls of the trough.

The other wall of the trough flares slightly outwardly to increase the width of the trough, so that the fruit pieces tend to roll onto their arcuate surfaces as they translate down the trough. The fruit pieces are thus oriented with the arcuate portion down and the cut face turned upwardly. In the final, discharge portion of the apparatus, the trough widens further, and the bottom is provided with a slight concave curvature. This concavity maintains the fruit in the cut face up orientation as it is delivered to the receiving moving belt.

A BRIEF DESCRIPTION OF THE DRAWINGS

FIG. 1 is a plan view of the fruit orienting apparatus of the present invention.

FIG. 2 is a side elevation of the fruit orienting apparatus of the present invention.

FIG. 3 is a cross-sectional view of the fruit orienting apparatus of the present invention, taken along line 3—3 of FIG. 2.

FIG. 4 is a cross-sectional view of the fruit orienting apparatus of the present invention, taken along line 4—4 of FIG. 2.

FIG. 5 is a cross-sectional view of the fruit orienting apparatus of the present invention, taken along line 5—5 of FIG. 2.

FIG. 6 is a cross-sectional view of the fruit orienting apparatus of the present invention, taken along lines 6—6 of FIG. 2.

FIG. 7 is a cross-sectional view of the fruit orienting apparatus of the present invention, taken along line 7—7 of FIG. 2.

DESCRIPTION OF THE PREFERRED EMBODIMENT

With reference to the accompanying drawings, and in particular FIGS. 1 and 2, the fruit orienting apparatus of the present invention generally includes a shaker table 11 which is provided with a receiving end 16 and a discharge end 17. As shown particularly in FIG. 2, the shaker table 11 is provided with a downward inclination from the receiving end 16 to the discharge end 17.

The shaker table 11 generally includes a pair of opposed vertically extending sides 12 and 13, and a bottom 14 extending therebetween. The bottom 14 is provided with irregular features of predetermind size and angular relationship, to orient a halved fruit piece with the cut side up, as will be explained in the following description.

A pair of support arms 18 are pivotally joined to the sides 12 and 13 of the table 11, adjacent to the receiving end 16 thereof. The arms 18 are in turn pivotally secured to a base support frame 21, as shown in FIG. 2. A longitudinally extending support member 26 is secured to a medial portion of the bottom of the table 11, and a pair of support arms 19 are pivotally joined to the support member 26. The arms 19 are in turn pivotally supported by the base structure 21.

Also pivotally secured to the support member 26 is one end of a lateral drive rod 24. The other end of the drive rod 24 is joined to an eccentric 22 which is secured about a rotary shaft 20. The shaft 20 is driven through a pulley wheel and belt arrangement by a motor 23. The reciprocating motion generated by the eccentric 22 is transferred by the drive rod 24 to the table 11, causing the table to shake continually and reciprocally. The pivotal mountings of the support arms 18 and 19 freely permit this reciprocal motion.

The sides 12 and 13 and the bottom 14 of the table 11 form a channel along which the halved fruit pieces translate under the urging of the inclination of the table and the vibrational energy provided by the drive rod 24. At the upper, or receiving, end 16 of the table 11 the bottom 14 is inclined not only longitudinally toward the discharge end 17, but also laterally downwardly toward the side wall 13. This is shown particularly well in FIG. 3. Thus, as halved fruit pieces, which are initially loaded onto the table 11 at the upper end 16, begin to translate down the table, they also gravitate toward the side wall 13.

In the next section of the shaker table 11, a generally rectangular trough 31 is formed in the bottom 14, as shown in FIG. 4. The trough is disposed adjacent to the side wall 13, which also forms one wall of the trough itself. The trough 31 also includes a side wall 32 which is parallel to and opposed to the side wall 13, and a bottom 33 which is normally related to the walls 13 and 32. All of the walls which form the trough are planar. The initial width of the trough 31, as defined by the span between the walls 13 and 32, is much less than the width of a halved fruit piece 30 which is being processed by the apparatus of the present invention. Thus, as the halved fruit piece, shown in phantom in FIG. 4, encounters the rectangular trough 31, it is caused to fall edgewise into the trough. This is true whether the fruit piece is initially oriented with the cut face down or up.

With the fruit half 30 disposed in the trough 31 it is supported therein on one edge of the generally planar cut face 40, and by contact of the arcuate surface 35 of the piece 30 with one of the side walls of the rectangular trough. The distance between the center of gravity of the fruit half 30 and the edge of the planar face 40 which supports the fruit piece, is sufficient to cause a rotational moment in the fruit tending to roll it over onto its arcuate side 35.

As shown in FIGS. 1, 5, and 6, the wall 32 of the rectangular trough 31 flares laterally as it extends longitudinally to increase the width of the trough as it extends down the table 11. As the typical fruit piece 30 translates down the widening trough 31, the aforementioned moment of rotation acting on the fruit piece causes it to roll gradually onto its arcuate surface 35. This is shown particularly well in FIGS. 5 and 6. As the fruit piece 30 translates to the portion of the table in which the trough 31 is greater in width than the fruit piece itself, the fruit piece is resting on the arcuate surface 35 thereof with the planar cut face 40 facing upwardly. This disposition, shown in FIG. 6, is the desired orientation for the halved fruit pieces.

In the next section of the shaker table 11, the wall 32 of the trough flares outwardly at a greater angle, to merge with the wall 12 of the table. In the same section, the bottom 33 of the trough 31 is inclined more steeply towards the discharge end 17, forming, in effect, a ramp 41 which increases the speed of delivery of the properly oriented fruit pieces to the discharge end 17. In the discharge portion of the present invention, shown in cross-section in FIG. 7, the bottom 33 is provided with a slightly upwardly concave configuration. This concavity is provided to urge the fruit pieces 30 into the center of the table. Also, the sides 12 and 13 are tapered to a decreased height, since higher outside walls are no longer necessary. The properly oriented fruit pieces 30 are discharged from the end 17 of the table 11 by their own momentum, and are carried away by high speed moving belt 42 to subsequent food processing procedures or apparatus.

It should be noted that multiple fruit flow channels for orienting the halved fruit pieces with the cut face up could be provided on a single shaker table 11. In one such form of the present invention, the fruit flow channels could be paired together in adjoining relationship, each channel including all of the features described in the foregoing. These paired channels would be symmetrical about a plane coincident with the side wall 12 shown in FIG. 1, with the side wall itself deleted from the paired embodiment.

It should be emphasized that the configuration of the apparatus of the present invention precludes the possibility of any halved fruit piece translating along the entire table 11 without achieving the cut face up disposition. The relative positioning of the sloped bottom 14 and the rectangular trough 31 determines that all of the halved fruit pieces must fall into the trough. Due to the shape and flare of the trough 31, the fruit pieces must roll into their cut face up position. Thus, the present invention assures that all of the fruit processed thereby ends up with the cut face up.

Furthermore, it should be noted that the apparatus of the present invention does not use any lateral guides or bumpers to guide the fruit pieces along the table 11. Thus, there is no opportunity for the fruit to clog or jam as it translates down the table. It may be appreciated, therefore, that the present invention delivers a continuous stream of properly oriented fruit, and no production time or capacity is wasted.

I claim:

1. Apparatus for orienting halved fruit pieces cut side up, comprising a longitudinally extending table having a receiving end and a discharge end, means for defining at least one channel extending longitudinally on said table, said means including a first side wall extending along the receiving portion of said channel, a bottom panel inclined downwardly to a junction with said first wall; a second portion of said channel coextensive with said receiving portion including a trough formed in a portion of said bottom panel, said trough including generally planar, orthogonally related sides and bottom member, said trough being disposed adjacent to said first wall; a third, discharge portion of said channel including a concave bottom member coextensive with said bottom member of said trough, and means for translating said fruit pieces along said channel from said receiving portion to said discharge portion.

2. The apparatus of claim 1, wherein the width of said trough at the beginning of said second portion of said channel is substantially less than the width of said halved fruit pieces.

3. The apparatus of claim 1, wherein one of said sides of said trough is coextensive with said first side wall of said channel.

4. The apparatus of claim 2, wherein said sides of said trough are flared slightly laterally from said beginning of said second portion to the end thereof, the distal portion of said trough being wider than the width of said halved fruit pieces.

5. The apparatus of claim 1, wherein said table is inclined downwardly from said receiving end to said discharge end.

6. The apparatus of claim 1, wherein said last mentioned means includes means for applying reciprocating vibrational motion to said table.

7. The apparatus of claim 1, wherein said first wall and said bottom plane are both planar members.

* * * * *